United States Patent [19]
Bilstein

[11] Patent Number: 4,791,755
[45] Date of Patent: Dec. 20, 1988

[54] SUBSTRATE FOR A CULTIVATED PLANT

[76] Inventor: Hans-Ulrich Bilstein, Meisenweg 22A, D-4300 Essen 17, Fed. Rep. of Germany

[21] Appl. No.: 932,197

[22] Filed: Nov. 18, 1986

[30] Foreign Application Priority Data

Nov. 19, 1985 [DE] Fed. Rep. of Germany ....... 3540963

[51] Int. Cl.⁴ .............................................. A01G 9/02
[52] U.S. Cl. .......................................... 47/66; 47/64; 47/80
[58] Field of Search .......... 47/80, 64, 59, 79, DIG. 7, 47/76, 73, 33, 66; 374/204; 428/616

[56] References Cited

U.S. PATENT DOCUMENTS

| | | | |
|---|---|---|---|
| 1,664,913 | 4/1923 | Bewley | 47/73 |
| 2,743,552 | 5/1956 | Hunter | 47/79 |
| 2,848,842 | 8/1958 | Tennant, Jr. | 47/DIG. 7 |
| 2,971,292 | 2/1961 | Malecki | 47/DIG. 7 |
| 3,900,378 | 8/1975 | Yen et al. | 47/DIG. 7 |
| 4,160,342 | 7/1979 | Dryer | 47/80 |
| 4,171,593 | 10/1979 | Bigglestone | 47/80 |
| 4,174,957 | 11/1979 | Webb et al. | 47/DIG. 7 |
| 4,216,623 | 8/1980 | Silver | 47/80 |
| 4,241,537 | 12/1980 | Wood | 47/DIG. 7 |
| 4,665,647 | 5/1987 | Behrens et al. | 47/73 |

Primary Examiner—Robert A. Hafer
Assistant Examiner—Kevin G. Rooney
Attorney, Agent, or Firm—Herbert Dubno

[57] ABSTRACT

A cultivated plant either which blossoms or has only leaves can be provided over a long time interval simultaneously with moisture and a nutrient material without watering. A root ball containing the nutrient material including the roots of the plant is surrounded by a moist material which simultaneously uniformly feeds it and supplies it with moisture. This moist material is advantageously formed from a mixture of swollen and then broken clay pieces and from a plurality of cellular or foamed plastic material pieces which is provided surrounding the root ball in a container for the plant advantageously in the ratio of about 2:1 or 3:1. In this way the plant with the usual earth or humus root ball can be provided with moisture uniformly over a long time interval without requiring that a particular container or plant be used.

17 Claims, 2 Drawing Sheets

4,791,755

SUBSTRATE FOR A CULTIVATED PLANT

FIELD OF THE INVENTION

My present invention relates to a substrate for a cultivated plant and more particularly, to a substrate for a live decorative plant for home or office.

BACKGROUND OF THE INVENTION

Cultivated decorative plants generally are grown in an earth or humus root ball provided with a nutrient material and supplied with moisture in a pot shaped container.

The ball forms with the roots of the plant a root ball. This cultivated plant is used in homes and offices and other places to bring a bit of nature into these places except of course in places where such plants are not permitted. They are accepted in human habitat to improve the climate and for good health.

It has been long known to put plants, i.e. both blossoming and green plants with a ball in clay or plastic pots and then with or without an outer covering pot to place them anywhere appearance or desire dictated.

It is necessary, to prevent deterioration, to water the plants periodically, e.g. daily, to prevent drying out. Regular watering therefore, requires a house caretaker or other worker to use special care in watering since the plants should be given neither too much nor too little water.

Moreover many kinds of plants require, because of the tendency to deterioration, a fertilization or feeding which also requires considerable care.

In order to improve the conditions for supplying moisture and thus the use of the work force, particularly in an office, among other things to minimize the work required as much as possible, a so-called hydroculture, hydroponic culture or soilless medium can be used in which the plant is grown without earth and/or humus and is only provided with aqueous nutrient solution.

Disadvantageously the hydroponic growth of blossoming plants is very difficult so that hydroculture is available only for a limited number of plant species.

Finally hydroculture requires special containers so that a change from an earth to a hydrocultured plant, also necessitates a change of the entire container. Because of this one usually finds in any one place either hydroculture plants or root ball plants provided with a soil conglomerate. For the flower lover it is unfortunate that he she can not correspondingly change plants, which he has long tended and loves, from soil culture to a hydroculture without a corresponding restructuring.

Particularly during the time of his absence, e.g. on vacation, the plant lover is forced to find someone who can provide the plants with the required moisture during his absence.

Consequently automatic irrigators have been developed which feed the plants with sufficient moisture by a tube or a so-called wick.

Also known are mixtures of humus or plant earth and absorptive mineral bodies as taught in German Open Patent Application DE-OS No. 32 26 719.

Further it is known to embed the plants with root ball in expanded clay bodies which should supply the root ball with water continuously. This material is commercially available under the tradename "Grolite". Disadvantageously a uniform continuous moistening of the root ball is not guaranteed because a moisture transport is guaranteed only for the particles or grains directly adjacent the root conglomerate.

It is already known to embed a potted plant root ball in a water supplying material which comprises a granular and/or flaky product (German Open Patent Application DE-OS No. 29 25 150). Water supplying materials can include granular spheres which can take up water or deformed sponge like plastic bodies. Also here a fully effective water transport in the water supply materials is not provided; several kinds of pots may have to be nested in one another and the plants put in the water supplying material remaining in the pots. In general this teaching fails to provide any sufficient basis for, at a low cost, avoiding unnecessary plant waterings.

OBJECTS OF THE INVENTION

It is an object of my invention to provide an improved substrate or cultivation system for a cultivated plant which avoids the drawbacks enumerated above.

It is also an object of my invention to provide an improved substrate for a cultivated plant which guarantees that sufficient moisture will be supplied over a period from several days to weeks and is usable for all potted plants so that the roots of the associated plants are protected from rotting and other possible damage.

SUMMARY OF THE INVENTION

These objects and others which will become more readily apparent hereinafter are attained in accordance with my invention in a substrate for a cultivated plant, particularly a house plant for home and office comprising a moist material which supplies moisture and an earth or humus root ball which provides a nutrient material for the plant, the substrate being filled into an advantageously shaped container.

According to my invention the moist material surrounding the root ball comprises a mixture of a plurality of broken lava and/or expanded clay pieces and a plurality of equal sized cellular or foamed plastic material pieces, which are arranged directly surrounding the root ball and are mixed with each other in a volumetric ratio of 2:1, to 5:1, preferably about 3:1.

A substrate for a cultivated plant according to the invention usually comprises an earth or humus root ball in which the roots can spread out and take the required nutrient materials from the substrate surrounding this ball, this substrate providing the root ball and at the same time the plant with the required moisture over a long time interval. The broken lava and/or expanded clay pieces store the moisture over the long time interval while the cellular or foamed-plastic material pieces at the same time supply and further conduct the moisture.

Because of the large storage capacity the root ball has at its disposal only a limited amount of moisture at any time, although it is continuosly supplied with moisture over long periods, so that rotting or other damage to the roots is prevented.

Advantageously this substrate can be used for all plants without requiring them to be newly grown or specially transplanted which puts the flower lover to great effort. Also it allows plants to be watered comparatively infrequently. The complete surrounding of the ball prevents a drying of one side since a hardening of the earth ball is reliably prevented even in strong sun light. Healthy plants with good growth are the result.

Accordingly my invention appropriately provides that the moist material comprises a mixture of lava pieces and/or clay pieces with a grain size of 4 to 8 mm and also cellular or foamed plastic material pieces of a similar size.

Particularly the lava pieces have a great many capillaries so that they have a structure advantageous for storing the moisture and are of such a nature that the individual capillaries are always free to be effective in the form provided while in contrast the swollen clay bodies can only have effective capillaries when they are broken. This is predetermined by the nature of the lava pieces.

The replenishment interval can be influenced by the mixture of lava and clay bodies in such a way that the storage volume can be varied and/or adjusted. The mixture of clay bodies and lava pieces has moreover the advantage that the comparative heavy weight of the lava pieces is compensated if the mixture does not have the best replenishment interval. A good packing density is obtained with the grain size of the granules of 4 to 8 mm which allows a reliable transport of moisture and the required air permeability which the transport of moisture also requires.

To avoid danger to the plant and/or substrate by an unplanned heating and/or an open flame according to my invention the cellular or foamed plastic material pieces are formed by a very nonflammable, permanently elastic plastic foam or natural sponge with a flake size of 4 to 6 mm. In this way when it contacts an open flame in a short time the flame is extinguished; however in no case will a fire be fed by anything found in the substrate.

The permanently elastic plastic foam prevents a detrimental compression and thus an impeded fluid transport while the flakes of 4 to 6 mm together with the lava pieces which have a grain size of 4 to 8 mm provide an optimum bed structure.

Advantageously the cellular or foamed plastic material pieces are made by tearing them from a web since the irregular shape formed by tearing can produce more earth like characteristics than uniform pieces. At the same time the regulating function of the cellular or foamed plastic material is improved since pieces with a large surface area are available in the flower pot.

To improve the appearance, the cellular or foamed plastic material pieces according to the inventor have an earth color which advantageously is the same as the lava pieces and/or the clay pieces. Thus the total fill has a resemblance to soil and, a generally uniform aspect, the nonuniform bodies as well as the cellular or foamed plastic material pieces and the lava having a positive influence on the appearance.

In the structure according to my invention advantageously a water layer can be provided under the lower end of the earth root ball. This water reservoir is so far underneath the plant roots however that the roots suffer no damage. To tie up this water reservoir completely and to guarantee a uniform delivery of water it is advantageous when the moist material comprises a plurality of lava pieces and cellular or foamed plastic material pieces as well as a swellable material, e.g. cellulose grains, serving as a source and storage means for water. The grains or pieces are advantageously present in the ratio of 40:1. This effective water source binds the fed in water completely, however it can feed it without difficulty to the root ball as required so that as depicted an always uniform water flow to the ornamental plant is guaranteed. By the complete binding of the water an additional advantage results in that water is not spilled on overturning such a pot and damage resulting from spillage is not produced. Moreover a particular visual impression can be attained with a transparent pot material.

To achieve a watering interval of several weeks the moist material surrounding the root ball advantageously has a thickness corresponding to half the root ball diameter in the vicinity of the base and the lateral wall of the container while the covering layer is thicker. A covering layer is provided which can store sufficient moisture for the named time interval and feed it uniformly to the root ball. It is desirable to establish the thickness of the moist material storing the moisture according to the desired watering interval. This means that for an office a comparatively long watering stage is achieved by a correspondingly wide layer in the moist material storing the moisture, while for example in homes where only a small window area is available for the placement of plants a correspondingly smaller and/or thinner layer is selected for the moist material storing the moisture.

It is appropriate to make the amount of moisture stored visible to the eye to make observation of the individual containers easy which is a particular advantage when different containers with different layer thicknesses are used which thus also have different filling intervals.

According to one embodiment of my invention, therefore, a pipe penetrating the moist material having a floating body in it, is provided which stands in or near the base and projects with its upper end over the edge of the container. This float water-level monitoring device is also used in hydroculture, since it allows the water level to be easily ascertained where the water level of the water reservoir is not directly visible. Furthermore this allows shutting off the supply of water when the reservoir is filled.

Since one can only operate the mechanical observation device when several things are guaranteed, that the floating body is not impeded by roots and chiefly that a water level is present, according to another feature of my invention a bimetallic moisture sensor can be mounted on a wall of the container slidably by which it can be accurately determined by sliding into the substrate and/or into the moist material surrounding the root ball whether this material has or has not been provided with the right amount of moisture. Such a sensor can respond to the fact that a moist material is generally cooler than ambient temperature. Since a long time after insertion of the bimetal into the moist region an oxidation is possible, the sliding arrangement guarantees that the bimetallic moisture sensor makes a correct report since it is only placed in the moist region as need arises.

It is advantageous further when the root balls and the surrounding moist material are associated with an inner container filled into an outer pot shaped container. The inner container comprises a material which has only a limited resistance to the roots of the plant. This material is advantageously a Styropor (a water permeable polystyrene). Because of that the roots can penetrate it so the roots of the plant can extend with time into the substrate without which a repotting and/or transplantation might be required because of the growth of the plant.

My invention is particularly characterized by a substrate which can be used in the usual house plant without requiring a repotting or a regrowth. The plants provided with a normal root ball can be replanted by taking the plant from the usual flower pot and putting it into the upper pot so that the root balls from the earth or humus receiving the roots is completely surrounded by the moist material of the invention comprising lava pieces and cellular or foamed plastic material pieces.

This covering acts then advantageously as a water reservoir and water distributor so that this kind of plant is provided with the life sustaining moisture but not in a life threatening quantity. Because of this uniform moisture storage and moisture supply this kind of plant can exist a long time without being watered. By suitable observation device the condition of the moisture level and/or the moisture quantity is tested and made visible. Advantageously in this way a satisfactory blossoming plant can be grown and maintained whereby through the hygienically advantageous material the root structure is protected from damage by rotting, fungi and the like.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
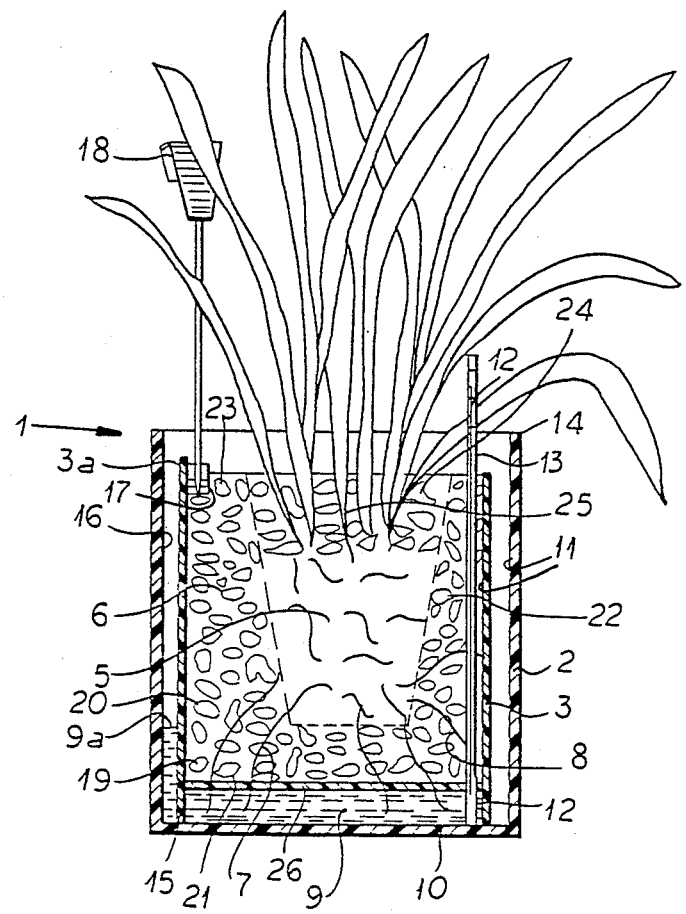
FIG. 1 is a vertical cross sectional view through a cultivated plant in a substrate in an inner and pot like outer container according to my invention.

The house plant shown in FIG. 1 is a leaf plant which is planted in an inner water permeable container 3 filled into an outer pot like container 2. The house plant has a plurality of long leaves which are provided with the required nutrient material by the root ball 5.

The root ball 5 which is in the inner container 3 is completely enveloped by a moist material 6 as is made clear from FIG. 1. The roots 7,8 penetrate this moist material 6 which stores and delivers moisture to them but need not necessarily include a nutrient source. The roots 7,8 reach in this embodiment through the moist material 6 until sometimes reaching the water reservoir 9.

The base 10 and the side wall 11 of the container are water tight so that a sufficient water level 9a is maintained in the container 2. This water level 9a of the water reservoir 9 is measurable by means of a floating body 12 which is positioned floating in a pipe 13 standing on the base 10 and which like the pipe 13 projects above the upper edge 14 of the outer container 2 and/or the inner container 3. By markings on the floating body 12 it is apparent to the user if sufficient water is being maintained in the container 2.

To form the water reservoir 9 in a simple way the bottom of the inner container 3 is held in a raised position by legs 15 so that between the base 26 of the inner container 3 and the base 10 of the container 2 a clear water layer results which is simultaneously provided with a nutrient material to allow the roots and the plant an optimum supply of nutrient.

Besides the floating body 12 or instead of it the moisture present in the moist material or also in the root ball 5 is measured by a bimetallic moisture sensor 18 mounted as shown on the wall 3a of the inner container 3 by a holder 17 or through it on the wall 16. This bimetallic moisture sensor 18 is pushed only for test purposes in the top layer, i.e. in the moist material 6 or in the root ball 5, while it remains usually in the position in FIG. 1 to avoid a rust build up among other things at the sensor.

The moist material 6 surrounding the root ball 5 comprises a plurality of clay bodies 19, 20 with a surface having open capillaries and a plurality of cellular or foamed plastic material pieces in a volumetric ratio of about 3:1. Instead of the clay bodies 19, 20 or, additionally, lava pieces 23, 24 can be used, which likewise have a high capillarity and thus are suitable to supply moisture over a long time interval. Lava pieces 23, 24 or clay bodies 19, 20 are used in a grain size 4 to 8 mm. The layer 25 covering the root ball 5 is chosen to be so thick that a drying of the root ball 5 is reliably prevented from above.

The house plant 1 has at its disposal an ever uniformly moist root ball 5 which produces the necessary nutrient base for the roots 7,8 and also serves as an effective surrounding for the roots which reach into the water reservoir.

It is indicated in FIG. 1 that a root ball 5 is used which is used usually in clay pots among other containers and now and in the past has been planted in the container 2 and/or 3 having straight walls 16. Instead of this container 2, 3 with vertical walls a conventional inclined wall container can also be used. The observation device comprising the floating body 12 in the pipe 13 is so mounted that it stands up on the base 10 and not on the wall 16.

Figure 2:
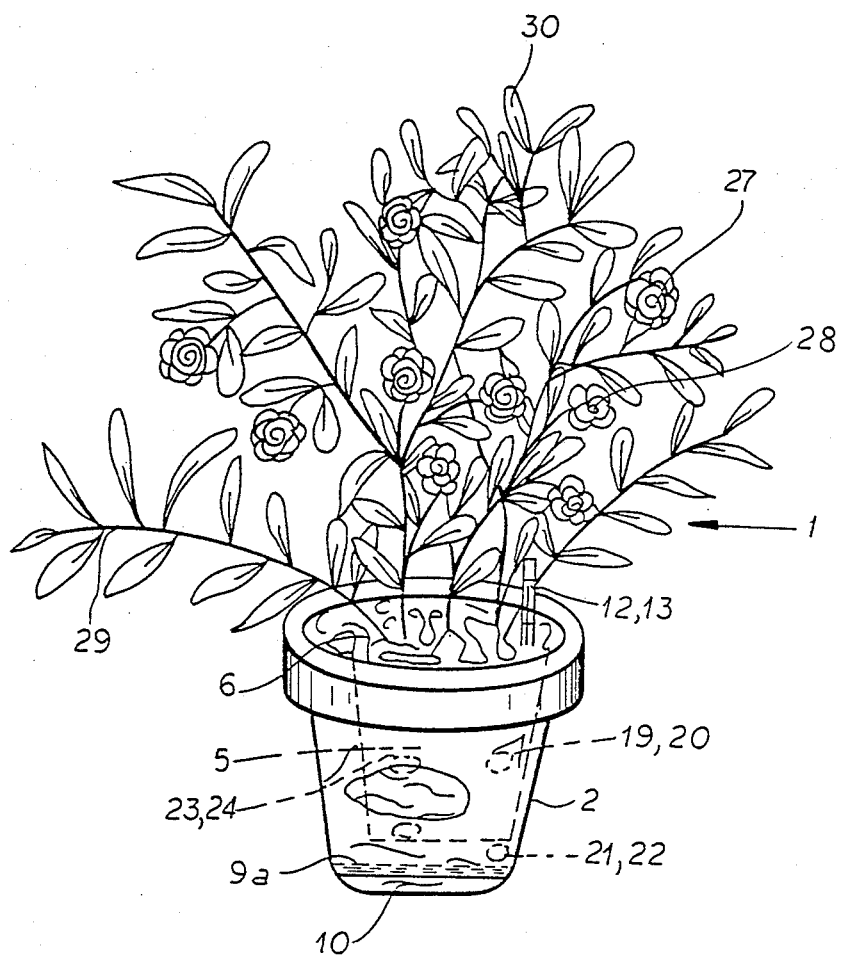
FIG. 2 is a perspective view of a blossoming plant in a substrate in a container according to my invention.

FIG. 2 shows a blossoming house plant 1 with the blossoms 27,28 and also the branches 29 and the leaves 30 provided uniformly with moisture. Here also the root ball 5 is surrounded by the moist material 6 which is formed from clay bodies 19, 20 or lava pieces 23, 24 and cellular or foamed plastic material pieces 21, 22. The structure of this embodiment of the substrate according to my invention for the house plant 1 includes a root ball 5 put into a container 2 formed as an upper pot, i.e. without an inner container, and a floating body 12 projecting from a pipe 13 for detecting the water level in the container 2 and/or in the moist material 6.

I claim:

1. In a planter for a cultivated plant, particularly a house plant for home and office, comprising substrate in the form of a moist material which supplies moisture and an earth or humus root ball which provides a nutrient material for said plant, said substrate being filled into a pot-shaped container, the improvement wherein said moist material surrounding said root ball comprises a mixture of clay bodies and broken lava pieces of a particle size of 4 to 8 mm and cellular or foamed plastic material pieces of a particle size of 4 to 6 mm, which surround directly said root ball and are mixed with each other such that the volumetric ratio of the sum of clay bodies and broken lava pieces to foamed plastic pieces is 3:1.

2. The improvement according to claim 1 wherein said cellular or foamed plastic material pieces comprise a nonflammable permanently elastic plastic foam or a natural sponge.

3. The improvement according to claim 1 wherein said cellular or foamed plastic material pieces have an earth color similar to that of said lava pieces and said clay bodies have.

4. The improvement according to claim 1 wherein said moist material further comprises grains acting as a water reservoir and source in a ratio of 40:1 in said mixture.

5. The improvement according to claim 1 wherein said moist material in the vicinity of a base and the lateral wall of said container has a thickness corresponding to half the diameter of said root ball, while a covering layer of said moist material for said root ball is thicker.

6. The improvement according to claim 1 wherein a pipe extends through said moist material and is provided with a floating body within said pipe and is arranged to stand close to a base of said container and projects with an upper end thereof above an upper edge of said container.

7. The improvement according to claim 1 wherein a bimetallic moisture sensor is mounted slidably on a wall of said container.

8. The improvement according to claim 1 wherein said root ball and said moist material are received in an inner container slidable into said pot shaped container, said inner container being composed of a material having only a limited resistance to the roots of said cultivated plant.

9. The improvement according to claim 1 wherein said inner container is composed of polystyrene.

10. A house or office plant arrangement requiring infrequent watering, comprising:
   a plant having a soil and humus root ball supplying nutrients to the plant;
   a pot receiving said root ball; and
   a body of a moisture retentive composition surrounding said root ball and comprising as a moisture holding component pieces of a material selected from the group which consists of broken lava and broken expanded clay thereof in a particle size of substantially 4 to 8 mm and torn pieces of a foamed cellular synthetic resin of a particle size of substantially 4 to 6 mm, the ratio by volume of said component to said pieces of a foamed cellular synthetic resin being substantially 3:1.

11. The house or office plant arrangement defined in claim 10 wherein said foamed cellular synthetic resin is a polystyrene.

12. The house or office plant arrangement defined in claim 10 wherein said pot is provided with a water reservoir below said body of a moisture retentive composition.

13. The house or office plant arrangement defined in claim 12 wherein said body has a thickness of at least half the diameter of said root ball.

14. The house or office plant arrangement defined in claim 12, further comprising means for signalling the level of water in said reservoir.

15. The house or office plant arrangement defined in claim 12, further comprising means for signalling the need for moisture in said body.

16. The house or office plant arrangement defined in claim 12 wherein said root ball and said body are provided in a polystyrene holder in said pot maintaining said body above the bottom of said pot, said reservoir being formed below said holder.

17. The house or office plant arrangement defined in claim 12 wherein said body includes a swellable moisture retaining substance.

* * * * *